Patented Aug. 29, 1939

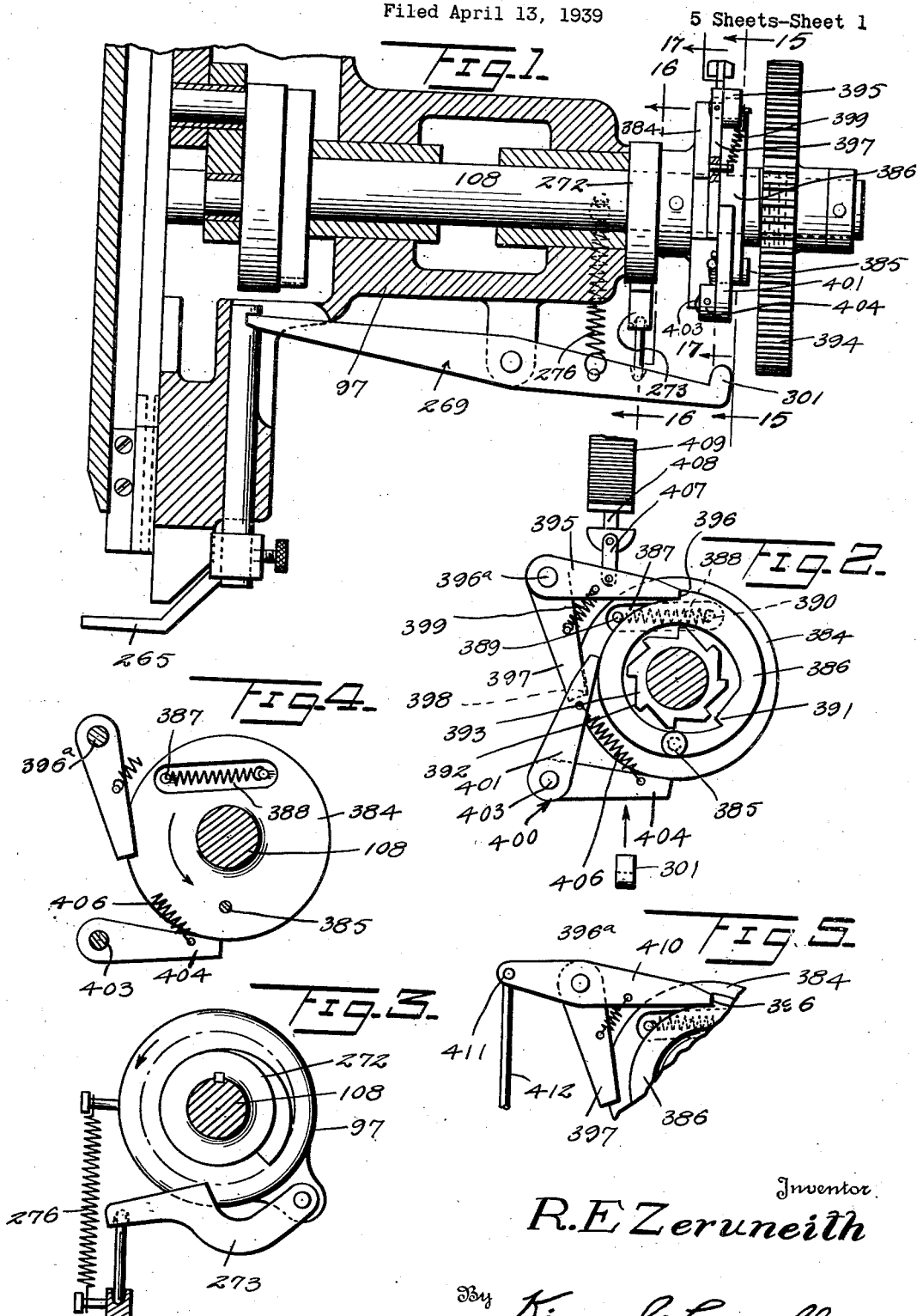

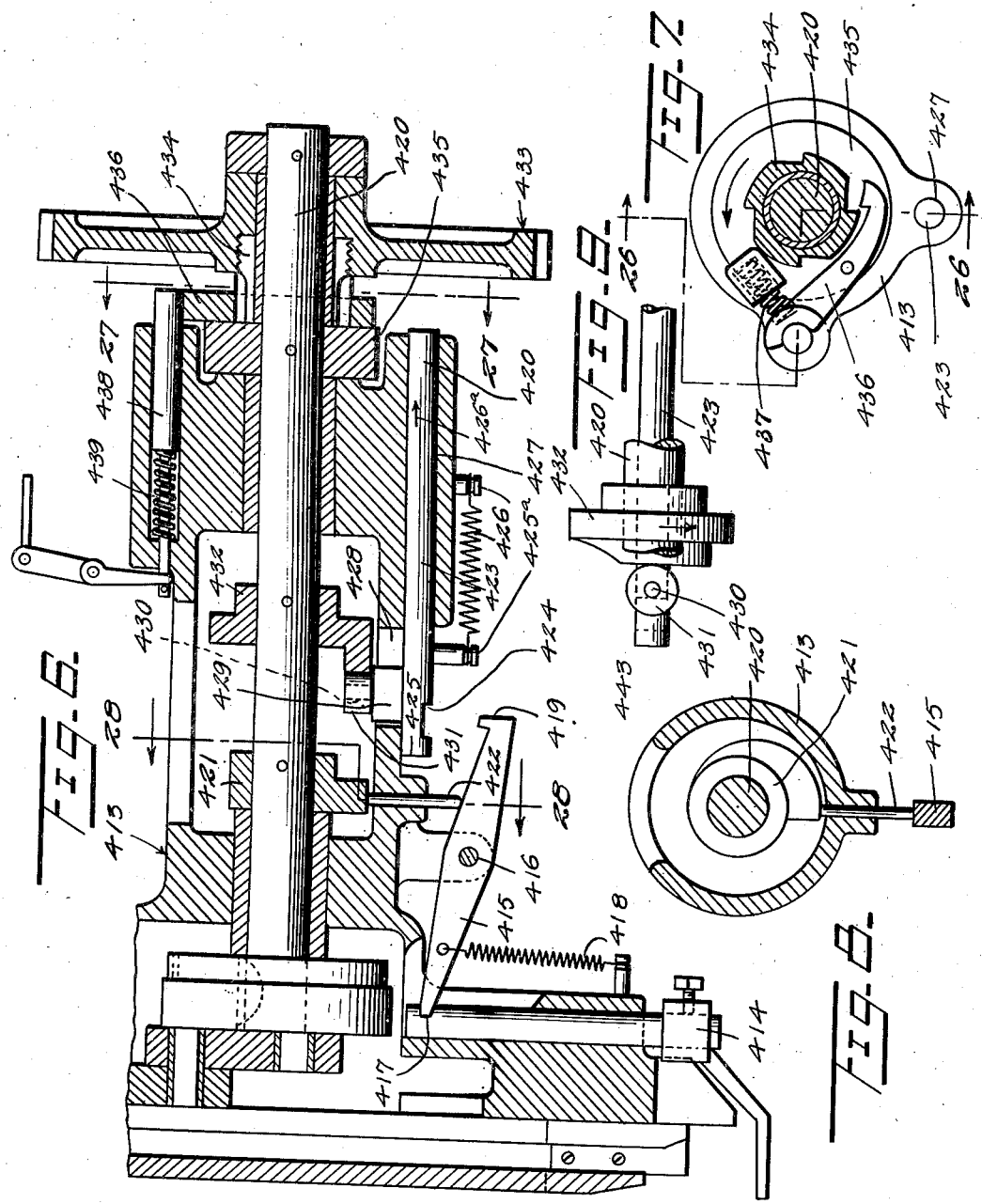

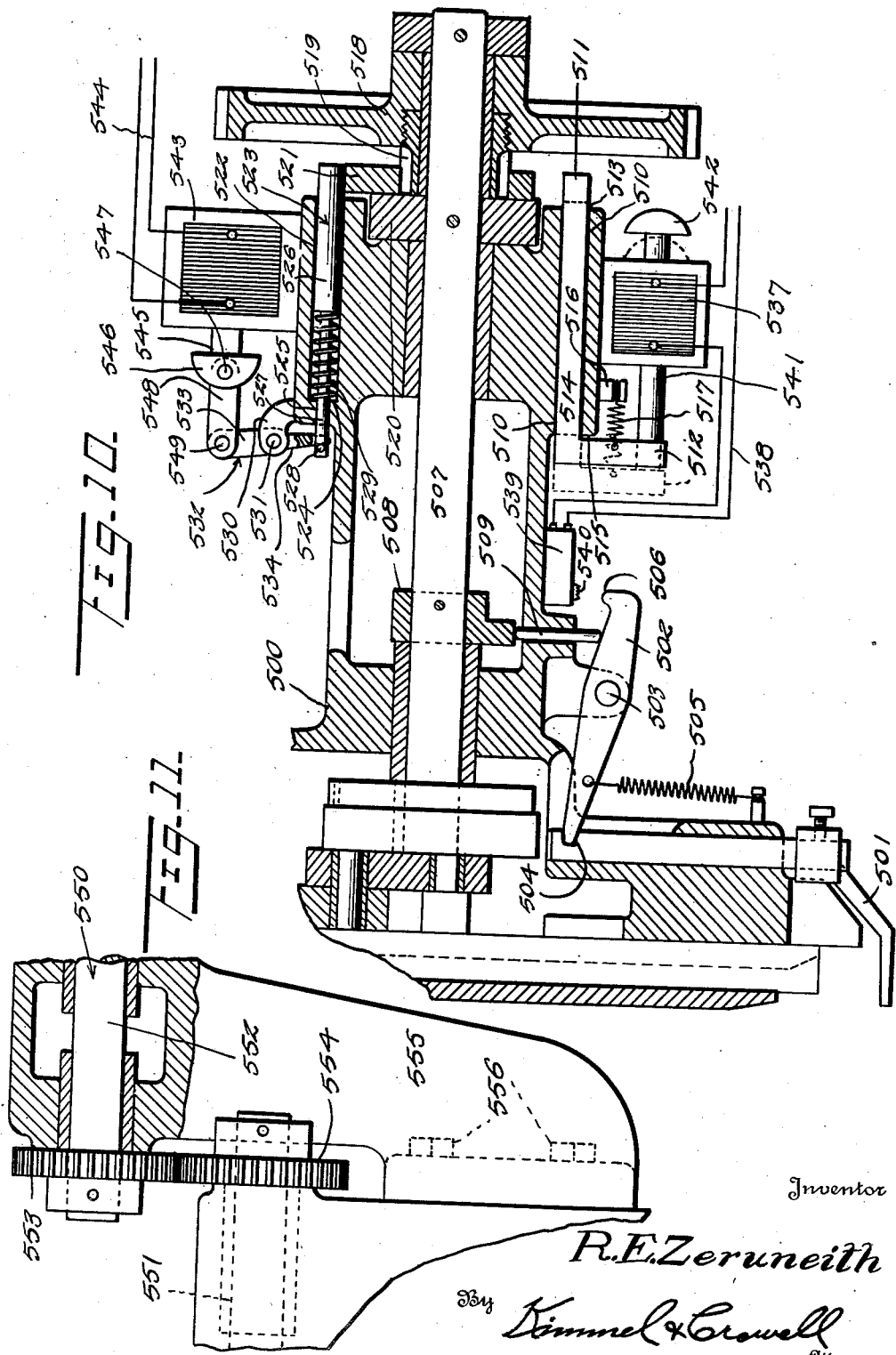

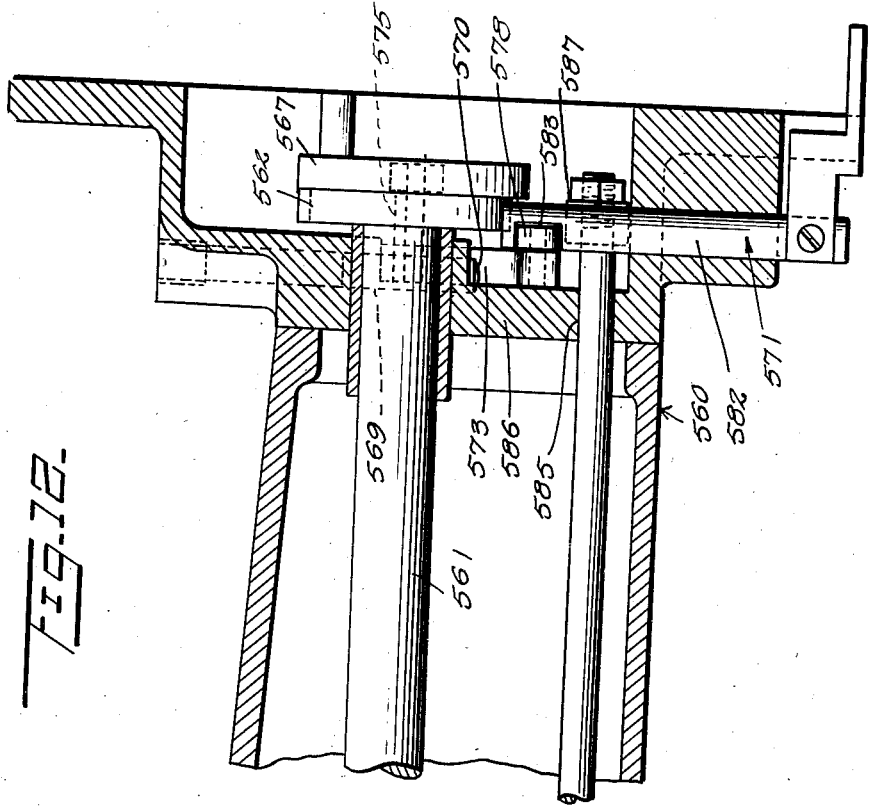
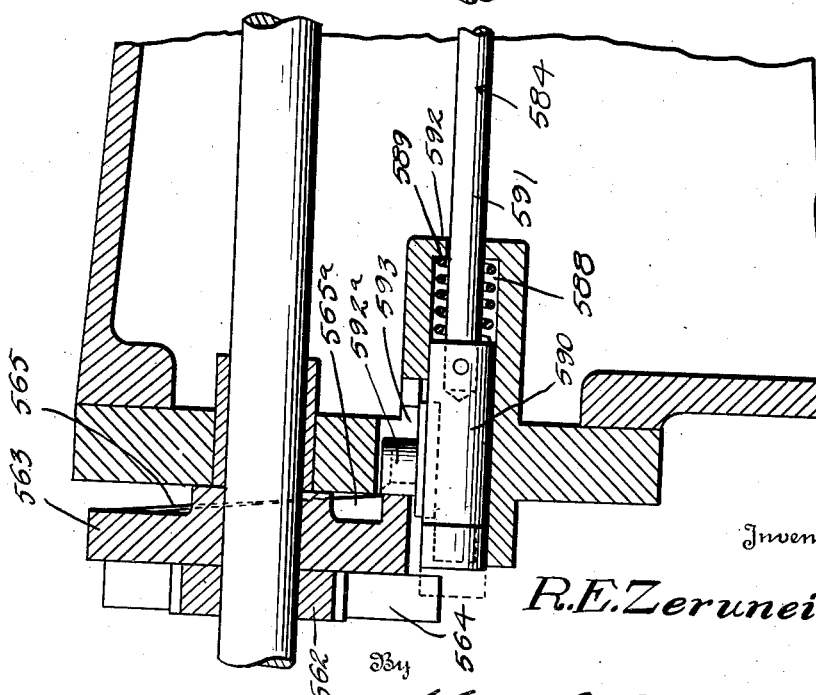

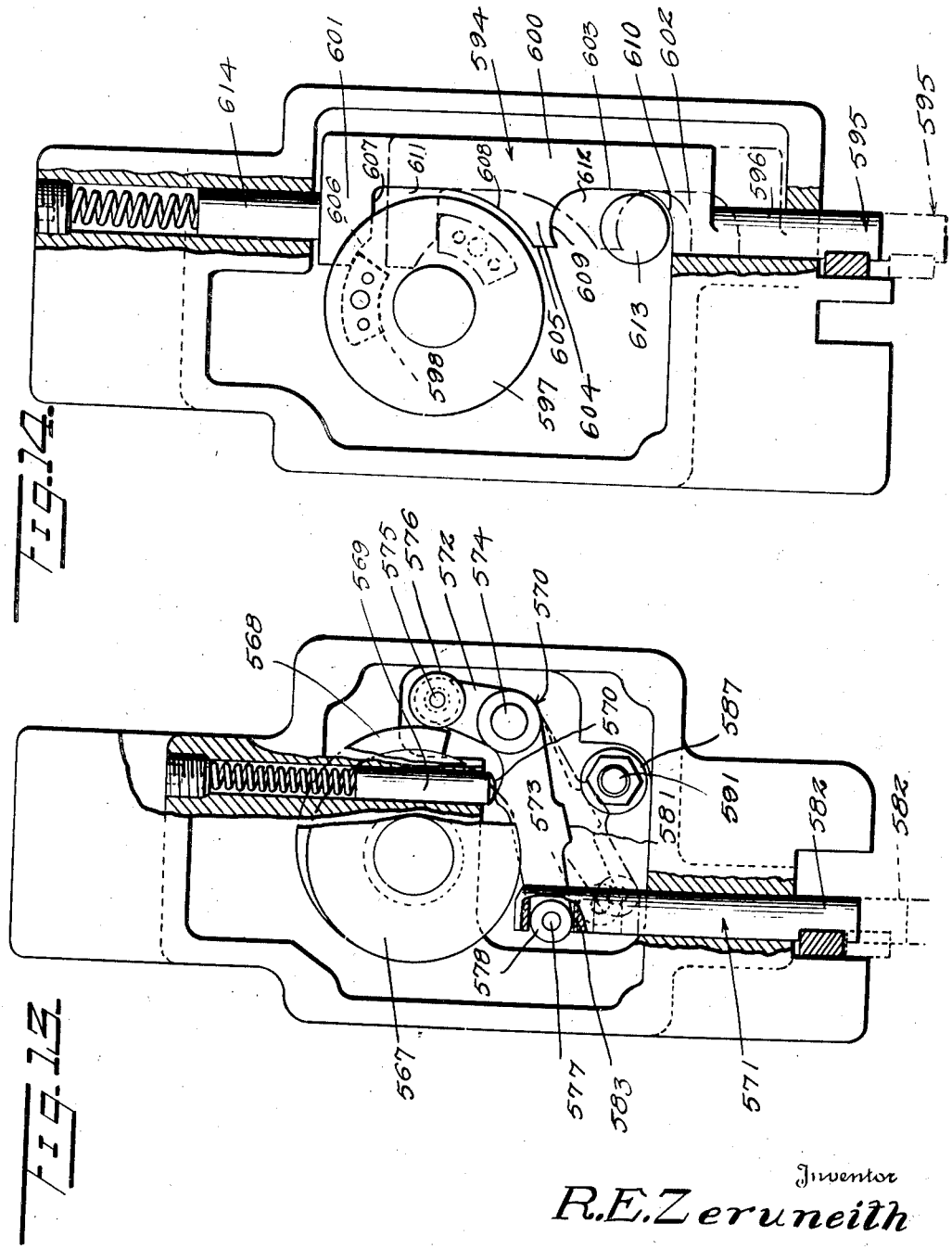

2,171,467

UNITED STATES PATENT OFFICE 2,171,467

SAFETY CONTROL

Rudolph E. Zeruneith, New York, N. Y.

Application April 13, 1939, Serial No. 267,739

20 Claims. (Cl. 192—134)

This invention relates to a safety control for use in connection with power driven machinery in general, but more particularly for employment with wire stitching machines of that type for forming and driving wire staples.

One of the objects of the invention is to provide, in a manner as hereinafter set forth, a safety control for coupling a driving structure to a driven structure for applying power to the latter, as well as acting as a safeguard for the attendant or operator against accidental injury, such as is commonly caused when inadvertently placing one's hands between relatively approaching power driven machine parts or members.

A further object of the invention is to provide, in a manner as hereinafter set forth, a safety control for the purpose referred to having as an element thereof a controllable latching device therefor.

A further object of the invention is to provide, in a manner as hereinafter set forth, a safety control for connecting and disconnecting a driven element to a driving element to apply power to the driven element and with said control so constructed and arranged relative to said elements to prevent the initial engagement of said elements if the operator's hand or some other obstacle is disposed between relatively movable parts of the machine with which said control is associated, and for immediately disconnecting said elements during the operation of the machine upon the interposition of an obstacle within the danger zone.

A further object of the invention is to provide in a manner as hereinafter set forth, a safety control for clutching a driving element to a driven element to apply power to the latter for moving parts of the machine with which said control is associated and with such control capable of automatically disconnecting said elements during the operation of the machine if the safety control, during its passage through given or defined danger zones encounters obstacles to arrest its movement.

Further objects of the invention are to provide, in a manner as hereinafter set forth, a safety controlling means for the purpose referred to which is comparatively simple in its construction and arrangement, readily installed in the machine for which it is to be associated, strong, durable, thoroughly efficient in its use and comparatively inexpensive to set up.

Embodying the aforesaid objects and others which may hereinafter appear, the invention consists of the novel construction, combination and arrangement of parts as will be more specifically described and illustrated in the accompanying drawings, wherein are shown embodiments of the invention, but it is to be understood that changes, variations and modifications may be resorted to which fall within the scope of the invention as claimed.

Figure 1 is a fragmentary view in longitudinal section of a wire stitching machine showing the adaptation therewith of a safety control in accordance with this invention, Figures 2, 3 and 4 are respectively sections on lines 15—15, 16—16 and 17—17 Figure 1, Figure 5 is a fragmentary view in side elevation illustrating a modified form of a manually operated detent lever capable of being substituted for the electrically operated detent lever employed by the control structure shown by Figure 1, Figure 6 is a fragmentary view, in section of a stitching machine on the line 26—26 Figure 7 and showing the adaptation therewith of a modified form of safety control, Figure 7 is a section on line 27—27 Figure 6, Figure 8 is a section on line 28—28 Figure 6, Figure 9 is a fragmentary view in top plan of the structure shown by Figure 6, Figure 10 is a fragmentary view in longitudinal section of a wire stitching machine showing the adaptation therewith of still another modified form of safety control in accordance with this invention and of the electrically controlled type.

Figure 11 is a fragmentary view in side elevation and longitudinal section illustrating the offsetting of a safety control and a driving gear with respect to the operating shaft of a wire stitching machine, Figure 12 is a fragmentary view in longitudinal section of a wire stitching machine showing the adaptation therewith of still another modified form of a safety control in accordance with this invention, Figure 13 is a view looking towards one end of Figure 12 being partly in section showing in full and dotted lines respectively the normal and shiftable positions of the controlling lever for the vertically movable ring guard or exploring foot structure, and Figure 14 illustrates still another modified form of safety control in accordance with this invention in elevation and vertical section.

The safety controls are illustrated as employed, by way of example in connection with a wire stitching machine of any type including staple formers and staple drivers, but it is to be understood that the controls are for employment with any type of machine for which they are found applicable.

The safety control shown by Figures 1 to 5 is illustrated by way of example as adapted in connection with a stitching head and the operating means for the latter of the form as shown by my copending application Serial No. 273,105, filed May 11, 1939. The safety control shown by Figures 1 to 5 is primarily designed for the adaptation of a ring guard or exploring foot 265 with respect to my Patent 1,855,162 granted April 19, 1932. This patent discloses a clutch similar to the one shown by Figure 1. Figure 1 discloses a pivotally mounted lever 269 which at one end engages in a recess formed in the slidable vertical shank or bar of the explorer 265. The other end of lever 269 is formed with a projection 301. A pulling spring for lever 269 is indicated at 276. A follower device 273 is associated with the cam 272 and actuates the lever 269.

With reference to Figures 1 to 5 a clutch carrier plate is indicated at 384 which is integral with cam 272 and pinned or keyed to shaft 108. Attached to the plate 384, by a fulcrum pin 385 is a clutch ring 386. The ring 386 is journaled on the pin 385. The plate 384 is formed with a pocket 387 and in which is arranged a spring 388. One end of said spring is connected to a pin 389 at one end of pocket 387 and the other end of the spring 388 is connected to the clutch ring 386, as at 390. The spring 388 urges the inwardly disposed tooth 391 of the ring 386 into engagement with any one of the teeth 392 on the clutch collar 383. The latter is fastened concentrically to the driving gear 394 which rotates freely on the shaft 108. A detent lever indicated at 395 and it is for engaging on the outwardly disposed tooth 396 on the clutch ring 386 in the power off position and such lever is pivotally mounted at one end on a pin 396a formed on the casting 97. Pivotally mounted on the pin 396a is a detent lever 397 whose free end is for engaging a notch 398 formed in the outer periphery of the plate 384. Connected to the levers 395, 397 is a spring 399 for urging lever 395 to engage tooth 396 and lever 397 to engage notch 398. A third detent lever is indicated at 400 and which includes a pair of arms 401, 402 disposed in angular relation. The arm 401 of lever 400 is for the purpose of engaging the out-disposed end 301 of the swinging lever 269.

The lever 400 is pivotally mounted on a pin 403 carried by the casting 97. A fourth detent lever is indicated at 404 and which is journaled on the pin 403 and it is capable of engaging in a notch 405 formed in the outer periphery of the carrier plate 384. The lever 404 is connected to the arm 401 of lever 400 by a spring 406 which urges arm 401 and lever 404 respectively into the path of the tooth 396 and in the path of the notch 398 respectively. The arm 402 of lever 401 is directly disposed in the path of the upwardly disposed end 301 of the swinging lever 369.

The detent lever 395 is connected by link 407 to the core 408 of a solenoid. The link 407 is pivotally connected with the core 408 and with the detent lever 395.

In the operation of the control shown by Figures 1 to 4 the latter will function as follows: When the solenoid 408 is energized, the lever 395 is lifted clear of the tooth 396. This causes the inwardly disposed tooth 391 on the clutch ring 386 to swing into engagement with one of the teeth of the constantly rotating clutch collar 393 due to the action of the spring 388. Simultaneously the lever 273 will slide off of the trailing end of the cam 272 and will be lifted by the spring 276. The ring guard or exploring foot 265 will then descend against the top of the work and the end 301 of the lever 269 will lift the arm 402 of the lever 400 and which in turn swings the lever 400 out of the path of the outwardly disposed tooth 396 on the clutch ring 386.

Should any foreign matter come in the path of the ring guard or foot 265, then the upstanding end 301 of the lever 269 will not engage the arm 402 of the lever 401 and the arm 401 will consequently remain in the path of the tooth 396 and will disengage the clutch before the staple former and staple driver have reached the work. The limbs of the operator will consequently be guarded from injury.

Due to the overflow of plate 384 and ring 386 when the clutch is disengaged, the end of lever 397 or the end of lever 404 respectively will slide into the notch 398 on plate 384. The spring 388 will counteract this overflow and turn plate 384 and shaft 108 clockwise until the ends of levers 397, 404 are seated against the radially disposed sides of the notch, see Figure 4, thereby preventing the further return rotation of the plate 384 and in turn preventing clicking of clutch teeth in the inoperative position. The angular displacement of levers 395 and 400 determines the amount of rotation of the shaft 108 if movement of the ring guard or foot 265 is intercepted.

In Figures 2 and 4 the two detent levers 397 and 404 are identical. The fulcrum pins 396a and 403 are spaced equidistant from the center of the shaft. The levers 395 and 401 are also of the same length. In other words, this device includes two sets of identical levers and throw-out stations for the clutch ring 386, one for completion of the cycle and one station for disengaging the clutch if movement of foot 265 is intercepted. In the latter case notch 398 will have rotated to a position opposite end of detent lever 404 simultaneous with notch 396 on ring 386 disengaging the clutch in the same manner as at station 396a. As many sets of levers as may be required may be placed around the clutch, but without having to add additional notches in plate 384.

With reference to Figure 5 a mechanical means is shown for operating the control structure illustrated by Figure 1, and in this connection there is employed the detent lever 410 which engages with the tooth 396. The lever 410 is of greater length than the lever 395 and said lever 410 is pivotally mounted intermediate its ends on the pin 396a. The outer end 411 of lever 410 has connected thereto a pull bar 412 capable of being shifted by the hand of the operator or it may be suitably connected to a foot tread means for shifting it. Otherwise than that as stated the form shown in Figure 5 will be the same as shown in Figure 1.

The modified form of safety control shown by Figures 6 to 9 is of a type which is controlled by the ring guard or exploring foot structure and applies more particularly to the retracting pin control.

With reference to Figures 6 to 9 a stitcher housing is indicated at 413 and which has slidably mounted thereon a vertically movable ring guard or exploring foot structure 414 which accords with the structure 265. A controlling lever is indicated at 415 and which is pivotally suspended from the housing 413, as at 416. One end of the lever 415 extends into a notch 417 formed in the upper part of structure 414. A spring 418 is connected to lever 415 and to the lower portion of the housing 413 and its purpose is to urge the structure 414 against the work. The lever 415 at its other end is formed with an upstanding protuberance 419.

The machine's main drive shaft is indicated at 420 and which has fixed thereto a cam 421 for operating a cam-follower pin 422 slidably mounted in the housing 413 and which seats on the top edge of lever 415 between pivot 416 and the protuberance 419. Slidably mounted in the lower portion of the housing 413 is a horizontally disposed safety plunger 423 having a notch 424 in its bottom arranged in proximity to its end 425. The notch 424 is for correlation with the protuberance 419 for a purpose to be referred to. The housing 143 and plunger 423 have connected thereto depending spaced grooved parallel studs 425ª respectively to which the ends of a controlling spring 426, for the plunger 423 are secured. The spring 426 normally urges the plunger 423 towards the clutch in a direction as indicated by the arrow 426ª. The housing 413 is formed with a horizontal channel 427 in which plunger 423 is mounted and adjacent and above one end of channel 427, the housing 413 is formed lengthwise thereof with a slot 428. The plunger 423 on its top and in proximity to its end 425 has formed integral therewith an upstanding support 429 arranged in the slot 427. Extending upwardly from the top of the support 429 is a vertically disposed shaft 430 for a cam roller 431. Fixed to the shaft 420 is a cam 432 which coacts with the roller 431 for shifting the plunger 421 against the action of spring 426. Fixed to the driving gear 433 is a clutch ratchet 434. Keyed or pinned to the shaft 420 is a clutch disc 435 on which is pivotally mounted a clutching pawl 436. Carried by the disc 435 is spring 437 bearing on pawl 436 and which functions to normally urge the pawl into engagement with the clutch ratchet 434.

Slidably mounted in the housing 413 is a horizontally disposed spring controlled clutching pawl latching plunger 438. The controlling spring for the plunger 438 is indicated at 439 and it normally urges the plunger 438 to the position shown in Figure 7 whereby the plunger 438 will act to hold the clutching pawl 436 clear of the ratchet 434 for providing for the discontinuing of the operation of shaft 420. The plunger 438 may be shifted to release the clutching pawl 436 by any suitable means, by way of example such as shown by the controls heretofore described. It will be stated that such means may be electrical or mechanical.

The operation of the control shown by Figures 6, 7, 8 and 9 will now be referred to. When the plunger 438 is retracted to free the pawl 436, the latter, by its controlling spring is urged into engagement with the ratchet 434, the shaft 420 will start to rotate and immediately pin 422 will slide off of the trailing end of cam 421 and spring 418 will urge the structure 414 to its relation with respect to the work. The cam 432 cooperating with the roller 431 retains plunger 423 in an inoperative position with respect to the clutching pawl 436 until the roller 431 leaves the trailing end of cam 432. If in the meantime the structure 414 has descended to its position relative to the work without interference, the lever 415 will be rocked on its pivot to lower its end 417 and elevate the protuberance 419 and the latter will engage in the notch 424 of plunger 423 and hold the latter in inoperative position, even after cam 421 has cleared roller 431, and the clutch and shaft 420 will therefore make a complete turn until the clutching pawl 436 is again intercepted and released by the plunger 438. If however, the structure 414 as it lowers meets an obstacle, such as a hand or finger, then in event the protuberance 419 will not engage in the notch 424, and when cam 421 clears the roller 431, the plunger 423 will be forced by its controlling spring 426 into the path of the clutching pawl 436 for engaging the latter and force it out of engagement with the ratchet 434, which action will cause the mechanism to come to rest before the staple former and the staple driver reaches the interference.

With reference to the modified form of safety control illustrated by Figure 10, a stitcher housing is indicated at 500 and which has slidably mounted therein a vertically movable ring guard or exploring foot structure 501 which accords with the structure 265. A controlling lever is indicated at 502 and which is pivotally suspended from housing 500, as at 503. One end of lever 502 extends into a notch 504 formed in the upper part of the structure 501. A spring 505 is connected to the lever 502 and to the lower portion of housing 500 and its purpose is to urge the structure 501 against the work. The lever 502 at its other end is formed with an upstanding protuberance 506.

The main drive shaft of the machine is designated 507 and has fixed thereto a cam 508 for operating a cam follower pin 509 slidably mounted in housing 500 and which seats on the top edge of lever 502 between pivot 503 and the protuberance 506. Slidably mounted in a channel 510 at the lower portion of the housing 500 is a horizontally disposed safety plunger 511. The channel 510 is open at each end. The plunger 511 is of greater length than and extends from each end of said channel. The plunger 511 at one end thereof is formed with a depending extension 512 disposed at right angles thereto. When plunger is in inactive position it slightly projects from the end 513 of channel 510 and also extends from the ends 514 of channel 510. The distance the plunger 511 extends from channel end 514, when the plunger is inactive is greater than the distance it extends from channel end 513. The inactive position of plunger 511 is shown by dotted lines and its active position in full lines. The plunger 511 is for the same purpose as the plunger 420 (Figure 6). That part 515 of housing 500 at channel end 514 constitutes a stop for limiting the extent of movement of plunger 511 when the latter is projected or moved to active position. The housing structure 500 has depending therefrom a pin 516 to which one end of a controlling spring 517, for the plunger 511 is attached. The other end of spring 517 is attached to the extension 512.

Revolubly mounted on shaft 507 is a driving gear 518 which has fixed thereto and extending inward therefrom a clutch ratchet 519 encompassing shaft 507. Keyed or pinned to the shaft 507 is a clutch disc 520 on which is pivotally mounted a spring controlled clutching pawl 521 of the same form and arrangement as the pawl 436 (Figure 7).

Slidably mounted in a socket 522 formed in the upper portion of housing 500 is a horizontally disposed spring controlled clutching pawl latching plunger 523 which functions in a manner similar to that of the plunger 438 (Figure 6). The base wall of the socket 522 is indicated at 524 and it is formed with an axial opening 525 open at each of its ends. The plunger 523 is formed of parts of two different diameters. The part of the plunger 523 of largest diameter is indicated at 526 and it is for correlation with the pawl 521 to latch the latter in non-clutching position. The part of plunger 523 of smallest diameter is indicated at 527, extends through the opening 525 and is formed in proximity to its outer end with a laterally disposed stud 528. The controlling spring for the plunger 523 is indicated at 529, is arranged in socket 522 between the plunger part 526 and the socket base wall 524, as well as surrounding the plunger part 527.

The housing 500 at its top is provided with an upstanding curved arm 530 to which is pivoted, as at 531 a two arm lever 532. The latter is upstanding and has its upper arm designated 533 and its lower arm at 534. The arm 533 is pivotally connected at its upper end, as at 535 to one end of a link 536. The lower end of the arm 536 at one side edge thereof opposes the stud 528 and is interposed between said stud and the outer face of the base wall of the socket 522. The lower end of arm 534 straddles the part 527 of plunger 523.

The plunger 511 is automatically electrically controlled for making it active and for such purpose there is employed a solenoid 537 having interposed in its circuit 538 a normally open switch 539 provided with a normally inactive circuit closer 540 of the spring controlled type. The solenoid 537 includes a core 541 which is of greater length than the body of the solenoid, extends in opposite directions from said body and includes a head 542 at one end and has its other end disposed in a manner to permanently abut or to magnetically attract the extension 512 of the plunger 511. When solenoid 537 is energized the core 541 thereof shifts the plunger 511 to the dotted line position. The solenoid is energized when the protuberance 506 is elevated to an extent to shift the circuit closer 540 to active position.

In the form of control shown by Figure 10 an electric contact is closed, if the structure 501 descends the full distance whereby the solenoid is energized and the plunger 511 will be shifted clear of the path of the revolving clutching pawl and allows for the stitch to be driven without interruption, but if the contact is not closed, as would be the case, if the descent of structure 501 is interrupted, then the safety plunger 511 will remain in place and will disengage the clutching pawl.

The plunger 523 is retracted to inactive position by an electrically operated means comprising a solenoid 543 in a normally open circuit 544. There is interposed in circuit 544 any suitable means, not shown for closing it. The core of solenoid 543 is indicated at 545 and it is formed with a head 546 having pivotally connected thereto, as at 547 one end of a link 548 which is pivotally connected at its other end, as at 549 to the upper end of the arm 533 of lever 532.

With reference to Figure 11 it illustrates a safety control offset with respect to the main driving shaft of the stitching mechanism, and in this connection 550 indicates a safety control but instead of such control being mounted on the main driving shaft 551 of the machine it is carried by a shaft 552 which is to be clutched to a driving gear, not shown therefor. The shaft 552 carries a gear 553 which meshes with a gear 554 on shaft 551. The supporting structure 555 of the control 550 is bolted to the machine frame, as at 556. The motor for operating the driving gear may be supported by the structure 555, or it may be bolted to the machine frame and power may be transmitted to the control 550 by any suitable means.

With reference to Figures 12 and 13 the modified form of safety control disclosed thereby is shown, by way of example in connection with a wire stitching machine 560 having its operating shaft indicated at 561. One end of shaft 561 is adapted to have revolubly mounted thereon one of the elements, not shown of a driving mechanism, not shown for the shaft 561. There is shown however, as a part of such driving mechanism a revoluble ratchet 562 which encompasses shaft 561. Fixed to shaft 561 and having one of its side faces opposing one side of ratchet 562 is a clutch disc 563. That side face of the disc 563 which opposes the ratchet 562 is provided with a pivotally mounted spring controlled clutching pawl 564 for correlation with the ratchet 562 for the purpose of clutching the latter to disc 363 to provide for the operation of shaft 561. The pawl 564 is of a construction and it is set up in a manner as the spring controlled pawls heretofore referred to and normally tends to engage the ratchet 562. There is associated with the pawl 564 a suitable latching mechanism, not shown in Figure 12 for normally retaining the pawl clear of ratchet 562. This latching mechanism may be of anyone of the forms heretofore referred to which includes a shiftable spring controlled releasable holding or latching plunger engaging with one end of the pawl 564 for the purpose heretofore set forth with respect to such plunger. The other side face of the disc 563 is formed with a cam surface 565 for a purpose to be referred to. The other end of the shaft 561 carries driving members 566, 567 for the staple forming and driving elements, not shown of the machine. The member 567 has its edge formed with a cam surface 568.

Mounted in the body of the machine and spaced inwardly with respect to disc 566 is a vertically disposed spring controlled plunger 569 normally tending to lower the controlling lever 570 of the safety control. The lever 570 provides for vertically moving an upstanding ring guard or exploring foot structure 571 slidably mounted in the body of and forms an element of the machine. The lever 570 also constitutes a latching member for a purpose to be referred to. The lever 570 includes a pair of arms 572, 573 which are arranged in angular relation with respect to each other. The arm 572 which is upstanding, is termed an upper arm and disposed throughout at an outward inclination. The arm 573 which is disposed at a downward inclination throughout to the horizontal, is termed a lower arm and is of greater length than the arm 572. The arms 572, 573 merge into each other and at such point of mergence the lever 570 is mounted for pivoting on a pin 574 secured to the machine body. The lever 570 is arranged within the machine body and has the upper end of its arm 572 formed with a laterally extending stub shaft 575 carrying a roller 576 which opposes the edge of disc 567. The free end of the arm 573 of lever 570 is formed with a lateral stud 577 on which is confined a roller 578. The lever 570 is arranged inwardly with respect to disc 566, but the stub shaft 575 on arm 572 is disposed to oppose and extend beyond the edge or disc 566 to align with the edge of disc 567. The arm 573 is positioned below and arranged in the path of plunger 569. The top edge of lever arm 573 is formed with an offset inclined surface 580 engageable by the lower end of plunger 569 for the purpose of shifting lever 570 on its pivot to depress arm 573 for normally and releasably holding such arm in a lowered position for a purpose to be referred to. The arm 573 intermediate the ends of its bottom edge is formed with a squared protuberance 581 for a purpose to be referred to.

The structure 571 includes a vertical disposed slidable rod 582 formed near its upper end with a groove 583 in which the roller 578 on lever arm 573 is slidably mounted and in this connection attention is directed to the dotted line showing Figure 13.

The control shown by Figures 12, 13 includes a spring controlled horizontally slidable normally latched inactive safety plunger 584 slidably mounted in the machine body. The purpose of plunger 584, when released is to shift and hold the clutching pawl 564 clear of the ratchet 562 to cause a discontinuing of the driving of the shaft 561. The plunger 584 extends through an opening 585 formed in a partition 586 in the machine body and has secured on its outer end a keeper 587 by means of a nut. The keeper 587 coacts with the protuberance 581 for latching plunger 584 in retracted or inactive position. Formed in the machine body is a socket 588 in which is mounted the controlling spring 589 for plunger 584. The latter is formed of two parts 590, 591. The part 590 is of greater diameter than part 591 and is arranged in the socket 588. The base wall of socket 588 is formed axially thereof with an opening 592 which aligns with the opening 585. The part 591 of plunger 584 is of greater length than part 590 and extends through the aligned openings 585, 592 and is connected to the part 590. The spring 589 is arranged between plunger part 590 and the base wall of socket 588 and surrounds plunger part 591.

Normally the keeper 587 is arranged outwardly with respect to the protuberance 581 on lever arm 573. The plunger part 590 is provided with an upstanding stud 592ª which is arranged in a slot 593 formed in the machine body. The stud 592 carries a roller 593 adapted to be engaged by the cam surface 565. The slot 593 opens into the socket 588. When the plunger 584 is projected, by its controlling spring for the purpose of separating the clutching pawl 564 from the ratchet 562, the roller 592 is disposed in a manner to enter a drop 565ª in the cam surface 565 to permit of plunger 584 being projected in the path of pawl 564 to separate the latter from the ratchet 562. The cam surface 565 on disc 567 coacts with the roller on lever arm 572 for rocking lever 570 on its pivot and in a direction to move lever arm 573 upwardly whereby the protuberance on the latter will be cleared of keeper 587, and the roller 578 coacting with the walls of the groove 583 of rod 582 will elevate the structure 571. The plunger 569 acts normally to shift lever 570 on its pivot to lower lever arm 573 to an extent to have the protuberance on the latter to coact with keeper 587 to latch plunger 584 in inactive position and to hold the protuberance to coact with the keeper until the pressure of the controlling spring for the plunger 569 is overcome by the cam surface 568 acting on roller 592. When plunger 569 acts on lever 570 to lower lever arm 573 the structure 571 is moved downwardly towards the work. Plunger 584 is held in inactive position during the operation of staple forming and driving, if no obstacle is interposed in the downward path of structure 571 during the operation of the staple forming and driving operation, first by cam surface 565, then by the protuberance, and then by cam surface 565 again.

If a foreign body or obstacle is interposed in the downward path of the structure 571 to arrest the downward movement of the latter, it will prevent the lowering of lever arm 573 to an extent to prevent the protuberance thereon coacting with the keeper and latch plunger 584 inactive, and as plunger 584 is not latched it will be immediately projected into the path of the clutching pawl, due to the drop 565ª in cam surface 565 releasing the plunger and release the latter from the ratchet 562 thereby providing for the discontinuing of the operation of the machine and prevent injury to the operator, if his hand or arm was the obstacle interposed in the downward path of the structure 571.

With reference to Figure 14 it discloses another modified form of safety control and of that type including the elements of the form shown by Figures 12, 13 with the exceptions that it does not include the controlling lever 570, the cam 568 on the edge of disc 567 and the groove or slot 583 in the rod 582 of the ring guard or foot exploring structure 571.

The structure shown in Figure 14 includes a vertically movable controlling element 594 which functions for the same purpose as the lever 570. In Figure 13 a ring guard or foot explorer structure is indicated at 595 and which is similar in construction to structure 571 with the exception that the vertically slidable rod 596 of structure 595 is not formed with a groove at its upper end for receiving one end of the controlling element 594. The latter also constitutes a latching member for the keeper 613 which is carried by the inner end of the safety plunger not shown. The controlling element 594 may be connected to or be formed integral with the upper end of rod 596, and is shown by way of example as being integral with the upper end of such rod.

As is shown in my copending application Serial No. 273,105 filed May 11, 1939, a driving gear is employed for operating the wire feed mechanism. This gear is indicated at 597 and has secured to its rear side thereof adjacent its perimeter a cam 598 of segmental contour for the purpose of elevating element 594 and for holding it when elevated.

The controlling element 594 is spring controlled and its controlling spring normally tends to lower element 594 against the action of cam 598 when the latter is moving element 594 to and for temporarily retaining it in its elevated or upper position. The element 594 is slidably mounted in the machine body 579, is disposed in rearward relation with respect to gear 597 and has its inner portion opposing that side of gear 597 to which cam 598 is attached.

The element 594 comprises an upstanding bar like body 600 formed at its upper and lower ends with inwardly arranged right angularly disposed extensions or arms 601, 602 respectively. The inner edge 603 of body 600 is formed with a rearwardly extended frusto tapered protuberance 604 constituting a latching member. The inner end terminus 605 of the protuberance is spaced a greater distance from the arm 601 than from the arm 602. The arm 601 has its lower edge formed of a curved inner edge part 606 upon the segment of a circle and a horizontal outer edge part 607. The top edge 608 of the protuberance is upon the segment of a circle. The bottom edge 609 of the protuberance is upon a segment of a circle but upon an arc less than that of edge 608. The top edge 610 of arm 602 is upon the segment of a circle. The bottom edge part 607 of arm 601, the top edge 608 of the protuberance and a portion of the inner edge 603 of body 600 forms an upper gullet 611. The bottom edge 609 of the protuberance, the top edge of arm 602 and the remaining portion of the inner edge of body 600 forms a lower gullet 612 for the passage therethrough of the inner terminal portion of the safety plunger, not shown and to permit of the keeper 613 being disposed beyond the front side face of the element 594. The inner end of arm 602 of the controlling element, as shown merges into the upper portion of the rod 596.

Bearing on the arm 601 is a spring controlled plunger 614, which is mounted on the body 579 of the machine and normally tends to lower the element 594 against the action of the cam 598. The edge parts 607, 606 respectively are engaged by the cam 598 on the revolving of gear 597 whereby the cam will elevate and temporarily hold element 594 in an elevated position. The keeper 613 is of a diameter greater than the diameter of the safety plunger. The radius of the edge 609 of the protuberance 604 conforms to that of the safety plunger.

When the machine is operating and the spring controlled plunger 614 is acting to move the structure 595 downwardly and if an obstacle is interposed in the downward path of said structure its movement will be arrested whereby the protuberance or latching member 604 cannot be positioned to oppose the rear face of keeper 613 to latch the safety plunger. Under such conditions the cam surface 565 (Figure 12) at this time positions the drop 565ᵃ therein to release the safety plunger as set forth relative to Figure 12.

The gear 595 revolving, carrying the cam 598 therewith will provide for the latter to engage and elevate and temporarily hold the controlling element 594 in elevated position until cam 598 moves off edge 606 whereby the plunger 614 will be permitted to act to lower element 594 to an extent to provide for the protuberance 604 to coact with the keeper 613 and latch the safety plunger in retracted position, if there is no obstacle interposed in the path of the structure 595.

The safety plunger employed in connection with the forms shown by Figures 12 and 14 are moved to retracted position manually, but before they are moved to retracted positions the ring guards or foot explorer structures are manually elevated, and operation is had only after the safety plunger has been projected to act on the clutching pawl to arrest the drive of the operating shaft of the machine.

It is readily obvious that a safety clutch of any of the types described arranged and operatively connected intermediate a motivating power and a mechanism will provide for the safeguarding of an operator or the machine elements proper at certain unprotected points of a machine.

It is to be understood that when reference is made in any one of the claims to "plunger", that such term will preferably imply a staple former or a staple driver, and that when the term "plungers" is employed, preferably, it will have reference to staple formers and drivers, but such terms, however, may imply one or more movable members.

What I claim is:

1. In a safety control for use in connection with the driving structure having an element moving in an operative path, a vertically movable slidably mounted spring urged ring guard structure exploring said operative path, a clutching means for and adapted to operatively connect said driving structure to an operating means therefor, a normally inactive means for controlling the clutching means for said operating means and including parts automatically made active on the interposition of a foreign body in said path engaged by said ring guard structure to automatically disconnect said clutching means, when the latter is active, from said operating means.

2. In a safety control for use in connection with a driving structure having an element moving in an operative path, a vertically movable slidably mounted ring guard structure, a clutching means for and adapted to operatively connect said driving structure to an operating means therefor, an actuatable means for controlling the connection and disconnection of the clutching means to and from said operating means and including normally inactive parts automatically made active on the interposition of a foreign body in said path engaged by said ring guard structure to automatically permanently disconnect said clutching means, when the latter is active, from said operating means, said actuable means being spring controlled, and means for actuating said controlling means in a direction for disconnecting said clutching means for said operating means.

3. In a safety control for use in connection with the driving structure, a vertically disposed slidably mounted ring guard structure, a clutching means for and adapted to operatively connect said driving structure to an operating means therefor, an actuatable means for controlling the connection and disconnection of the clutching means to and from said operating means and including parts automatically made active on the interposition of a foreign body in the downward path of the ring guard structure to automatically disconnect said clutching means, when the latter is active, from said operating means, said clutching means being spring controlled, said actuatable means being spring controlled, and electrically operated means for actuating said controlling means in a direction for disconnecting said clutching means from said operating means.

4. In a safety control, a bodily revoluble spring controlled clutching pawl normally tending to clutch a prime mover to a structure to be driven thereby, a releasable spring controlled slidably mounted plunger engaging with said pawl to releasably hold the latter in non-clutching position, and a plunger automatically extended into the path of the clutching pawl, when the latter is released for moving it to non-clutching position when an obstacle is interposed in the control.

5. In a safety control bodily revoluble clutch pawl for releasably clutching a revoluble driving element to a revoluble driven element for operating the latter, a releasable latching plunger for releasably holding said pawl in nonclutching engagement with said driving element, a normally inactive electrically operated structure providing, when active, for shifting said plunger to released position with respect to said pawl, a normally inactive safety plunger, a normally inactive electrically operated means for shifting, when active, said safety plunger in the path of said pawl, when the latter is in clutching position for moving the pawl out of such position, and means for automatically making said electrically operated means active on the interposition of a foreign body in the control to thereby provide for the safety plunger moving said pawl out of clutching engagement and discontinue the operation of said revoluble element.

6. In a safety control, a vertically movable element, a bodily revoluble clutch pawl normally tending to clutch a revoluble driving element to a revoluble driven element for operating the latter, a normally inactive spring controlled safety plunger for disposing, when active, in the path of said pawl, and means for automatically making active said plunger to releasably hold said pawl in non-clutching position on the interposition of a foreign body in the downward path of movement of said element, said plunger remaining permanently active until normally returned to inactive position.

7. In a safety clutch, a driving clutch member, a driven clutch member, a plurality of normally inactive unclutching members angularly disposed to disengage the clutch at chosen points of an operating cycle, and means for controlling the unclutching of said unclutching members from a point in a defined danger zone.

8. A safety control comprising a projectable and retractable spring controlled safety plunger adapted when projected to engage and shift a clutch pawl from clutching engagement with a driver, a revoluble element for temporarily holding said plunger in retracted position and including means to permit of the projecting of the plunger to pawl engaging position, a keeper on said plunger, a vertically movable structure, a spring urged pivoted lever formed of a pair of arms, one constituting respectively a shifter for vertically moving said structure and a latching member for coaction with the keeper for retaining said plunger retracted when said revoluble element is inactive relative to holding the plunger in retracted position, said structure arresting the shift of said lever in one direction when the downward movement of the structure is arrested by an obstacle in the downward path thereof thereby preventing the coaction of the latching member with the keeper and permitting of the projecting of the plunger to engage the pawl, and means coacting with other arm of the lever for moving the latter in a direction to elevate said structure.

9. A safety control comprising a projectable and retractable spring controlled safety plunger adapted when projected to engage and shift a clutch pawl from clutching engagement with a driver, a revoluble element for temporarily holding said plunger in retracted position and including means to permit of the projecting of the plunger to pawl engaging position, a keeper on said plunger, a vertically movable structure, an upstanding vertically movable controlling element for vertically moving said structure, a spring urged means for permanently tending to move said element downwardly, said element being formed with a latching member for coaction with the keeper for retaining said plunger retracted when said revoluble element is inactive relative to holding plunger in its retracted position, said structure preventing on the downward movement of said controlling element, when the downward movement of said structure is arrested by an obstacle in the downward path of said structure the coaction of the latching member with the keeper and permitting of the projecting of the plunger to engage the pawl, and means engaging with said controlling element for elevating it and for temporarily holding it elevated against the action of said spring urged means.

10. In a safety control for a machine having a work holder, one or more reciprocatory plungers moving relatively to the work on the holder, a common operating means for the plungers, a driving means for said operating means and a releasable means for releasing said operating means, the combination of a normally inactive secondary releasing means for said operating means, and a slidably mounted reciprocatory explorer exploring in the operative path of the plungers, permanently engaged with and making active, when an obstacle is interposed in the path of the explorer, the said secondary releasing means to release said operating means from said driving means to thereby arrest the cycle of the machine and to discontinue the operation of the plungers in said operative path.

11. A safety control for a machine of that type including a prime mover, a work holder, a movable member for action on the work holder, a driving means for said movable member, a latchable clutch between said prime mover and said means and a primary releasing means for the clutch, the combination of a slidably mounted spring-urged reciprocatory explorer for discovering the presence of a foreign body in the operative path of said movable member, and a secondary releasing means for the clutch, said explorer and secondary releasing means having coacting parts to provide for the secondary releasing means to release the driving means from the prime mover before the completion of a normal latching cycle relative to the clutch on the presence of a foreign body in the operative path of said movable member.

12. In a safety control for a machine of that type having a prime mover and a latchable driven element, the combination of a slidably mounted spring-urged reciprocatory explorer operable from said driven element and a normally inactive arrester operable by said explorer, said explorer and said arrester coacting to arrest the motion of said driven element on the interposition of a foreign body in the path of said driven element.

13. In a safety control for a machine of that type having a work holder, one or more reciprocatory plungers moving relatively to the work on the holder, a common operating means for the plungers, a driving means for said operating means, a prime mover, a clutching mechanism between said driving means and prime mover and a primary releasing means for said mechanism, the combination of a normally inactive secondary releasing means for said clutching means, and a reciprocatory explorer exploring in the operative path of the plungers correlated with and making active, when an obstacle is interposed in the path of the explorer the said secondary releasing means to release said driving means from the prime mover to thereby interrupt the cycle of the machine and discontinue the operation of the plungers.

14. In a machine having a stationary work holder, one or more reciprocatory plungers movable relatively to the work on the holder, a common operating means for the plungers, and a releasable driving means for said operating means, the combination of a normally inactive releasing means for said driving means, and a slidably mounted reciprocatory explorer travelling in the path of the plungers and moving independently of the plungers, correlated with and making active, when an obstacle is interposed in the path of the explorer the said releasing means to release said operating means from said driving means to thereby interrupt the cycle of the machine and to discontinue the operation of the plungers.

15. In a safety control for a machine of that type employing a prime mover and a driven structure operated from the prime mover, the combination of an explorer to explore the area to be travelled by a moving part of said driven structure, and a normally inactive arrester operable from said explorer, said explorer and said arrester coacting to disconnect the driven structure from said prime mover on the interruption by an interposed body of the full operative course of said explorer.

16. In a safety control for a machine of that type including a prime mover, a reciprocatory plunger having an operative stroke, and a driving means for said plunger, said driving means and prime mover having coacting parts for releasably coupling them together, the combination of a reciprocatory explorer operating from said driving means for exploring the path of the operative stroke of the plunger, and a normally inactive releasing means correlated with and made active by the explorer when the latter meets with an obstacle for shifting the coacting part of said driving means clear of the coacting part of said prime mover to thereby arrest the cycle of the machine and to discontinue the operative stroke of the plunger.

17. In a machine of that type employing a driving structure including a movable member, a reciprocatory explorer for locating an obstacle in the operative path of said movable member, said explorer being spring urged in its movement in said path independently of the said movable member and disposed in advance of said movable member, and means coacting with said driving structure for returning said explorer to its starting position.

18. In a machine of that type including a prime mover, a primary clutch latching and unlatching means, and a driven structure including a movable member, the combination of an explorer for exploring the path of said member to determine the presence of a foreign object in such path, and a secondary unlatching means for said primary means operable on the presence of a foreign object in said path, said explorer and secondary means having coacting interengageable parts acting alternately for restraining the said secondary means in any one cycle of the machine during which the explorer does not determine the presence of a foreign object in said path.

19. In a safety control for use in connection with a reciprocatory operating structure, an explorer structure having a part exploring the operative path of the said operating structure, a clutching means operatively related to the operating structure, and an operating means for the latter, and means for controlling the operation of the clutching means, including parts normally inactive and automatically made active on the contact of the explorer with an object in the path of the latter to automatically latch the said clutching means in disconnection from said operating means.

20. In a safety control for a machine of the type having a moving member for operating on a piece of work and including an operating structure for said member and a clutch operatively related to said structure and said member, an explorer for exploring in the operative path of said moving member in its work contacting direction of movement, and means normally inactive, but rendered active on a predetermined amount of pressure contact of said explorer with an object in its path, for acting on said clutch to cause the latter to disconnect the operating structure for said member from said member, said means fully released from any engagement with said explorer, when rendered active and remaining so until manually returned to inactive position.

RUDOLPH E. ZERUNEITH.